July 4, 1950         J. C. BUSH         2,514,025
MICROCHOKE VALVE
Filed Aug. 19, 1944         2 Sheets-Sheet 1
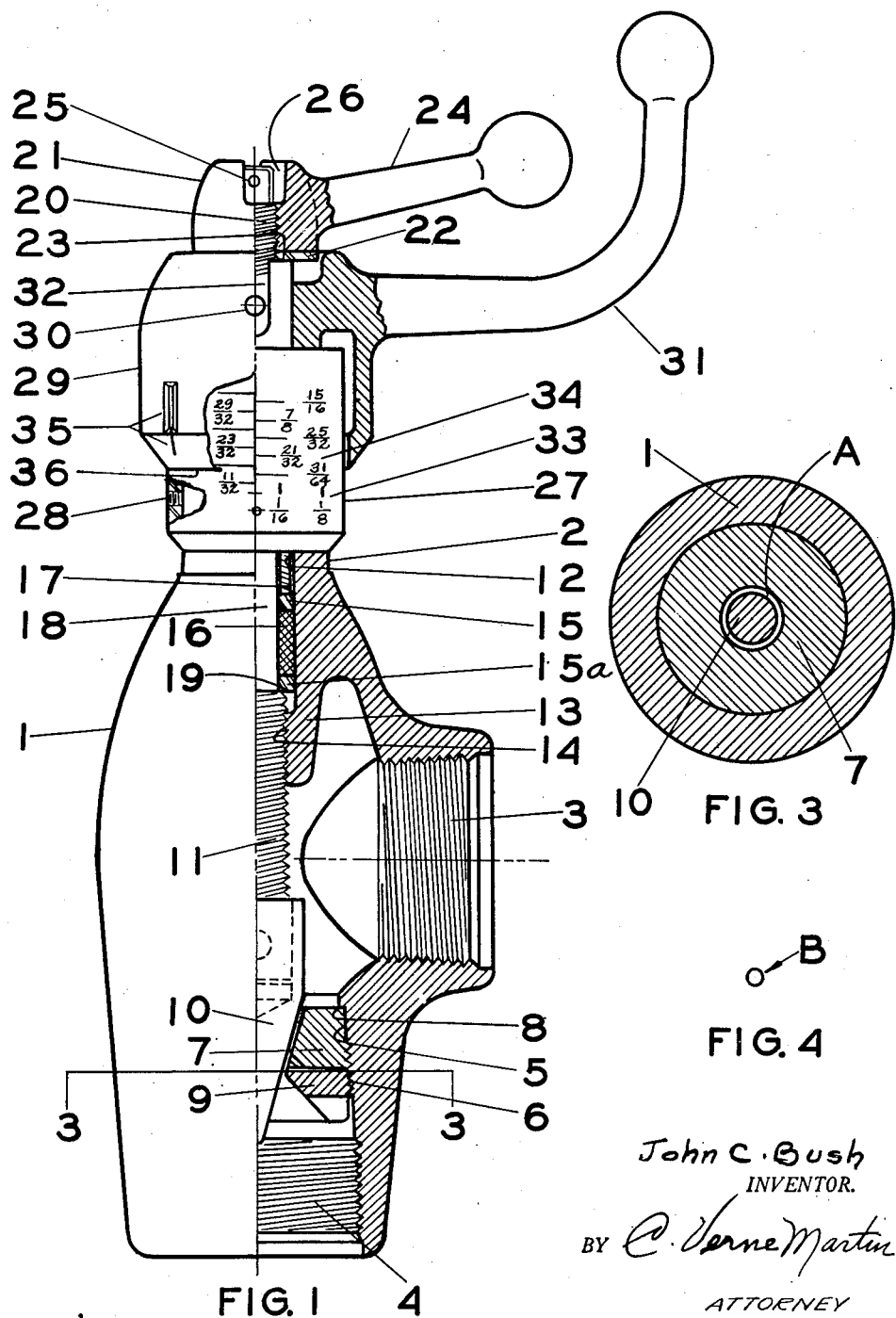
John C. Bush
INVENTOR.
BY C. Verne Martin
ATTORNEY

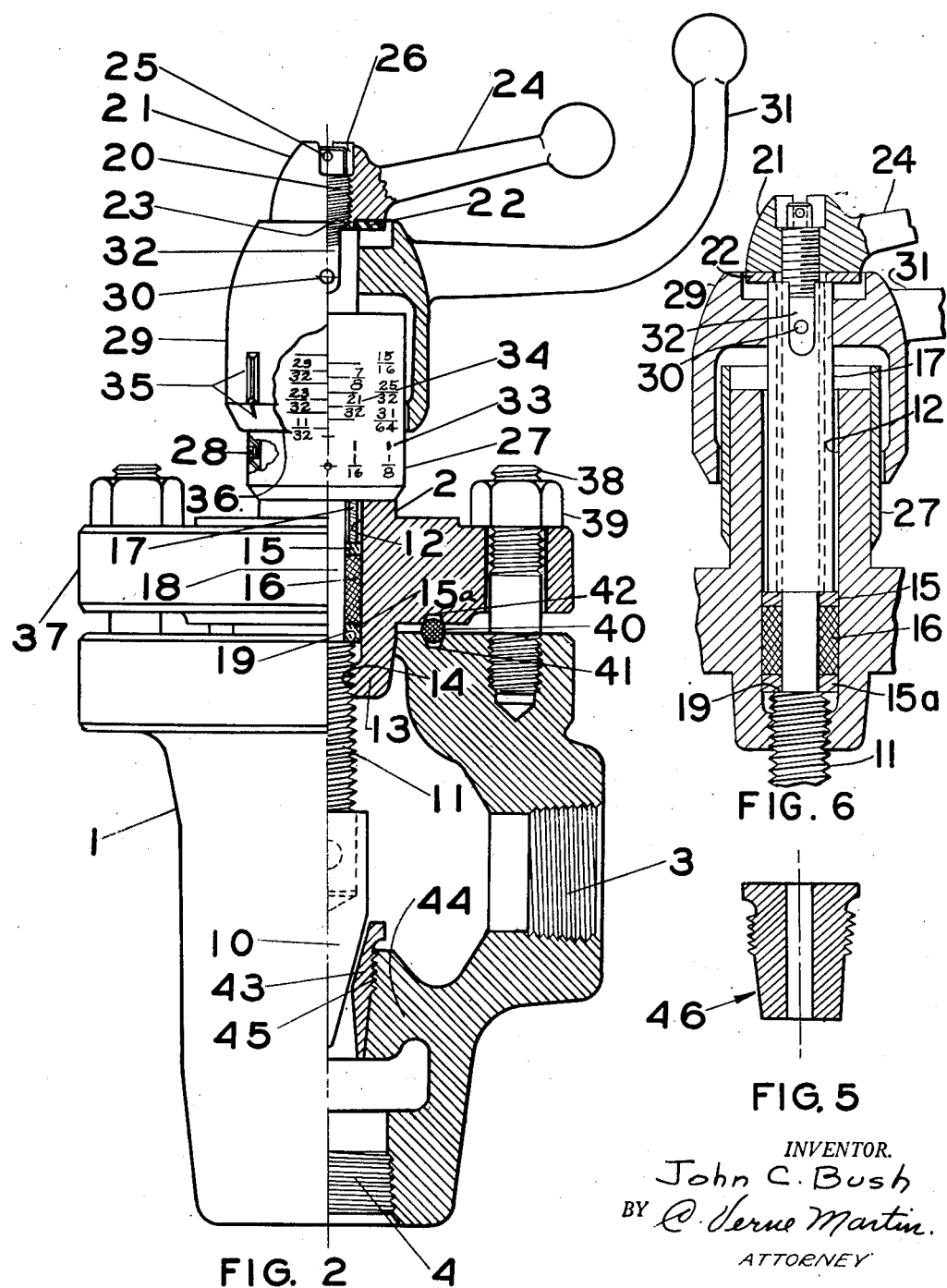

Patented July 4, 1950

2,514,025

UNITED STATES PATENT OFFICE 2,514,025

MICROCHOKE VALVE

John C. Bush, Toledo, Ohio, assignor to The National Supply Company, Pittsburgh, Pa., a corporation of Pennsylvania Application August 19, 1944, Serial No. 550,268

6 Claims. (Cl. 251—50)

This invention relates to improvements in control apparatus of a type suitable for controlling the fluid flow from oil, gas or other such wells.

In controlling high pressure wells in localities where large volumes of sand are encountered in the well fluid, it is desirable to use a flow head with an adjustable flow bean or choke valve for regulating the flow of fluid from the well.

Such equipment eliminates the serious cutting out of the flow head resulting from the abrasive action of the sand particles traveling at high velocity due to the well head pressure.

Due to the present governmental proration requirements, it is especially necessary to have a control apparatus so designed that a micrometer adjustment may be obtained with respect to the volume of fluid flowing through the head.

It is, therefore, one of the objects of this invention to provide a control device which can be adjusted very accurately and minutely and wherein such adjustment may be held in locked position.

Another object is to provide a simple and easily readable micrometer type of indicator to visibly designate the orifice opening of the valve.

Another object is to provide a flow bean with a calibrated orifice means enabling the setting and locking in place of the bean tip at a selective, definite position for securing a known or measured volume of flow.

Another object is to provide a novel type of lock for the valve stem, which functions to simultaneously compress the packing around the valve stem and the adjacent recess in the wall bore of the valve body to seal off well pressure as well as to lock the stem against rotation.

Another object is to provide a friction type of lock for the valve stem which also functions to compress the packing between the stem and the recess in the bore and at the same time to radially expand the packing into sealing engagement and the stem into locked position with respect to the orifice opening.

Other objects and advantages of this invention will become apparent during the course of the following description and appended claims in connection with the accompanying drawings illustrating the preferred and alternate constructional embodiments of this invention, wherein like parts are designated by like numerals.

Fig. 1 is a side elevational view, partly in section, of a micrometer adjusted flow valve embodying the principles of the present invention and is the preferred construction.

Fig. 2 is a side elevational view, partly in section, of an alternate construction, wherein the body is formed in two parts and held together as a unit by studs or other suitable means.

Fig. 3 is a cross section on line 3—3 of Fig. 1 showing the annular space or valve opening between the valve and seat.

Fig. 4 is a graphic representation of the equivalent orifice diameter opening shown at A in Fig. 3.

Fig. 5 is a central, vertical, longitudinal section through a flow restricting member or flow bean of a given orifice opening.

Fig. 6 is a vertical section through the packing compressor and valve stem adjusting mechanism.

In the drawing (Fig. 1), shown for illustration purposes only, the numeral 1 designates a valve body provided with an upstanding cylindrical extension 2 and threaded inlet and outlet ports 4 and 3 respectively adapted to be positioned on one of the branches of the customary Christmas tree of a well head assembly (not shown) or at any preferred position in the flow line.

In Fig. 1 the valve body 1 is formed of a unitary casting of the conventional angle valve construction. It is provided with a tapered valve seat bore 5 and an internally threaded portion 6 adjacent its lower end, both of which are coaxial with the threaded opening 4. It is adapted to receive an internally tapered valve seat 7, within the tapered bore 5, which bears against a shoulder 8 at its inner end and is locked in seating position within said bore by means of the threaded lock ring 9.

A tapered plug valve or choke 10 is adapted to form either a seal between the tapered inner surface of the valve seat 7 and the outer tapered peripherial surface of the choke 10, or to form an annular opening of definite area between the said surfaces, shown at A (Fig. 3).

A valve stem 11 is secured within an opening in the upper end of the choke 10 and extends upwardly and beyond the top surface of the valve body extension 2.

The upper portion of the body 1 and the extension 2 are recessed as at 12 in axial alignment with the valve seat bore 5. The portion 13 of the body 1 is internally threaded as at 14, in axial alignment with the bore 5 and recess 12, and is adapted to threadably engage the lower threaded portion of the valve stem 11 to regulate the orifice opening between the valve 10 and the valve seat 7.

A novel enclosed packing unit is provided to seal off pressure between the valve stem 11 and the recess 12 in the body 1 and to frictionally lock the stem against rotation, consisting of a pair of junk rings 15 and 15a with packing 16 interposed therebetween and a packing compression sleeve 17 slidably surrounding a reduced portion 18 on the valve stem 11. The juncture of the reduced portion 18 and the upper end of the lower threaded portion of the stem 11 forms a shoulder 19 upon which the lower junk ring 15a rests and forms a stop for the compression of the packing 16. The upper end of sleeve 17 extends upwardly and beyond the cylindrical extension 2 on the body 1.

The protruding end of stem 11 is threaded at its outer end as at 20. A packing compression and lock nut 21 engages this threaded portion of the stem, bearing against a thrust washer 22 which in turn bears against the end surface 23 of the sleeve 17. The nut 21 is provided with a handle 24 to facilitate the operation thereof. A pin 25 projects through the end of the stem 11, extending into a slot 26 in the upper end of the nut 21 to limit the travel of said nut and keep it from becoming detached from the stem.

As the nut 21 is screwed down against the washer 22, bearing against the end surface 23 of the sleeve 17, the sleeve is forced downwardly against the upper surface of the top junk ring 15, thus compressing the packing 16 against the upper surface of the lower junk ring 15a. The downward pressure exerted by the nut 21 is resisted by the lower surface of the lower junk ring 15a bearing against the shoulder 19 on the valve stem 11. The compression of the packing 16 being thus restricted, further downward pressure on the sleeve 17 causes the packing to expand radially and bear snugly against the stem and inner wall surface of the packing recess 12 to effect a fluid seal therebetween as well as to simultaneously provide an efficient means to frictionally secure the stem against rotation and consequently hold the choke valve 10 in a positive locked position.

For the purpose of accurately and visibly indicating equivalent orifice diameter openings and changes of small increments thereto I employ the principle used in micrometer calipers wherein a graduated barrel 27 surrounds the extension 2 and is secured in place thereon by means of a headless set screw 28, or any other suitable means. A thimble 29 is secured to the stem 11 by any convenient means such as by pin 30 or by welding. The thimble surrounds and is freely revolvable about the barrel 27 and is provided with an operating handle 31.

For adjustment purposes in originally setting the device and to compensate for wear of the tapered surfaces of the valve seat 7 and choke valve 10 and to further allow the thimble 29 and stem 11 to operate freely as a unit and not conflict with the sleeve 17, the latter is slotted as at 32 to allow for free vertical travel of said stem and thimble.

A unique method of indicating the orifice opening in terms of equivalent orifice diameter is provided in the following manner. By equivalent orifice diameter opening is meant an opening whose diameter would give an area equivalent to the area produced by the annular space between the valve 10 and its seat 7 at its smallest point of separation. For example, see Figs. 3 and 4. Assuming the area of the annular space A (Fig. 3) to be 0.0031 square inch, the diameter of a circle or circular opening which will give this area will be $\frac{1}{16}''$ as shown at B Fig. 4. A plurality of indicating marks 33 are scribed vertically on the barrel 27 denoting the equivalent orifice diameter openings in $\frac{1}{16}''$ increments from zero to one complete turn of the screw threaded valve stem 11. These graduations are shown in this particular manner to enable the operator to quickly and clearly ascertain the exact equivalent orifice diameter opening during this cracking operation of the valve. After the valve has been opened one complete turn it is unnecessary to further sub-divide the opening graduations and the marks indicating the equivalent orifice diameter openings for each complete turn of the valve stem are shown by the horizontal graduations 34 on the barrel. From the nature of the taper of the valve 10 rising vertically the equivalent orifice diameters follow the course of a parabolic curve which accounts for the particular markings on the barrel 27.

An indicator mark 35 is provided on the thimble 29 to coincide with the vertical indicating marks 33 on the barrel 27. After the first complete revolution of the thimble 29 and stem 11, as a unit, the bottom end surface 36 of the thimble will register with the horizontal graduations 34 on the barrel to indicate the equivalent orifice diameter opening on up to full opening.

As the valve 10 and seat 7 become worn it is a simple matter to adjust the relative location of the barrel 27 and thimble 29. This is accomplished by advancing the stem 11 by means of handle 31 on thimble 29 so that the valve 10, attached to the stem, will seat on its seat 7. At this stage of the operation the headless set screw 28 is loosened and the barrel 27 is rotated on the extension 2 so that the zero mark on the barrel coincides with the indicator mark 35 on the thimble. Set screw 28 is then tightened and the device is again ready for use.

It is very easy to set the choke valve 10 for any desired equivalent orifice diameter and to maintain the choke in this position. When the desired opening is attained the lock nut 21 is screwed down on top of the sleeve 17, which action simultaneously frictionally locks the choke valve 10 in position and at the same time effects a fluid seal as described above.

The alternate construction shown in Fig. 2 operates in the same manner as the device shown in Fig. 1. In this case the body 1 is provided with a bonnet 37 which is secured to said body 1 by means of a plurality of studs 38 and nuts 39. Suitable packing 40 is provided in the recesses 41 and 42 to maintain these two parts in sealing engagement and thus form the equivalent of the unitary structure shown in Fig. 1. The bonnet is provided with the same type of upstanding cylindrical extension 2 as shown in Fig. 1. The packing recess 12 and the portion 13 internally threaded at 14 to engage the lower thread on the valve stem 11 is also an integral part of the bonnet.

Another constructional difference between Fig. 1 and Fig. 2 is the method of supporting the valve seat. In Fig. 2 a valve seat 43 is held in position within an annular boss 44 by means of screw threads 45. The purpose of this construction is to provide for simplicity in changing the seat when the occasion demands.

The type of construction shown in Fig. 2 readily adapts itself for use when the well is put on a definite rate of flow, due to proration, etc. When this becomes advisable it is only necessary to remove the bonnet 37 with all the regulating equipment attached thereto and install the proper size flow bean 46 (Fig. 5) in the threaded opening 45 and provide a suitable cover flange (not shown) to take the place of the bonnet 37.

While only the preferred and one alternate form of my invention have been disclosed and described herein, I do not wish to be limited or restricted to the specific details set forth and wish to reserve to myself any further embodiments, modifications and variations that may appear to those skilled in the art or fall within the scope of the appended claims.

Having fully described my invention, what I claim as new and desire to secure by United States Patent, is:

1. An adjustable flow regulating device including a hollow vented valve body provided with a seat, a bonnet provided with an upstanding cylindrical extension, a packing recess therein and a threaded bore in axial alignment with and below said recess, means to secure said body and bonnet together in pressure sealing engagement to form a unitary structure wherein said seat and packing recess are in axial alignment, a valve in said body in registry with said seat, a stem on said valve extending above said extension, a graduated barrel surrounding and adjustably secured directly to said extension, a thimble revolvable about said barrel and secured against relative radial and axial movement with respect to said stem and valve to impart axial adjusting movement to said valve, an index marking on said thimble to register with said graduations on said barrel to indicate the position of said valve with respect to said seat, a packing element in said recess, a packing compressing sleeve surrounding said stem and within said recess, the lower end of said sleeve contacting the upper end surface of said packing element, a locking and packing compressing means threadably engaging said stem above said thimble and contacting the upper end surface of said sleeve to compress said packing element and to lock said valve in any selected position with respect to said seat independently of said valve actuating thimble.

2. A hollow vented valve body provided with a seat therein and an extension thereon, a valve in registry with said seat, a stem on said valve in packed sealing relation with said body and extending above said body extension, said valve and stem being axially movable with respect to said seat, a valve opening indicating means including a graduated barrel surrounding and adjustably secured directly to said body extension, a thimble revolvable about said barrel and secured to said stem intermediate the length of said stem to prevent relative radial and axial movement with respect to said stem and valve and to impart axial movement to said valve, an index marking on said thimble to register with said graduations on said barrel to visibly indicate the position of said valve relative to said seat, a slotted sleeve interposed between said stem and thimble and lock means threadably engaging said stem portion extending through and above said thimble to intimately contact said sleeve to lock said valve in any desired position with respect to said seat independently of the said valve actuating thimble.

3. A hollow vented valve body provided with a seat, a stuffing box having a packing recess and an internally threaded portion therein, a packing unit in said recess, a valve stem with a threaded portion and valve attached, adapted to register with and move axially with respect to said seat and threadably engaging said stuffing box, a packing compression sleeve slidable in said recess and bearing against said packing unit, means threadably engaging the extreme upper end of said stem and bearing against said sleeve to compress said packing in said recess and to lock said stem and valve against rotation with respect to said seat, a barrel adjustably secured to said body and having graduations thereon to indicate increments of axial movement of said valve with respect to said seat, a second means secured to said stem intermediate the length of said stem to independently adjust said valve with respect to said seat, said last named means being provided with an indicator marking to visibly register with said graduations on said barrel to indicate the position of said valve with relation to its seat.

4. An adjustable flow regulating valve comprising a hollow vented body provided with a seat, a valve including a stem in said body in registry with said seat and movable axially with respect thereto, a packing recess within said body, a packing element within said recess and in sealing engagement with said stem, a barrel secured to said body and having index markings thereon, a thimble having an index marking thereon, revolvable about said barrel and secured to said stem intermediate the length of said stem to transmit axial movement to said valve and stem with respect to said seat, said index markings on said barrel and thimble registering to indicate the position of said valve relative to said seat, a slotted sleeve interposed between said stem and thimble and above said packing element, and a locking device threadably engaging said stem above said thimble and free from contact with said thimble to intimately bear against the upper end surface of said sleeve to lock said stem and valve in any selected position with respect to said valve seat independently of the said valve actuating thimble.

5. An adjustable flow valve provided with a device to set and lock the valve at a selected position for securing a definite volume of flow therethrough and to visibly indicate the equivalent orifice diameter opening of said valve comprising a hollow vented body having a valve seat therein, a stem, a valve thereon within said body and in axial alignment with said seat and movable axially with respect thereto, a packing recess within said body, a packing element within said recess and in sealing engagement with said stem, a barrel adjustably secured to said body, a thimble secured to said stem intermediate the length of said stem and revolvable about said barrel, means associated with said thimble to provide unitary axial movement to said thimble, stem and valve with respect to said valve seat, graduations on said barrel to indicate the different equivalent orifice diameter openings between said valve and seat, an index marking on said thimble to successively register with the graduations on said barrel as the thimble is revolved about said barrel and the orifice diameter opening between said valve and seat is varied, a slotted locking sleeve interposed between said stem and thimble and above said packing element and a locking nut screw threadably engaging said stem above said thimble and free from contact with said thimble and engaging the upper end surface of said locking sleeve to lock said stem and valve in any selected position with respect to said valve seat independently of the valve actuating means.

6. An adjustable flow regulating valve provided with a micrometer type indicator to visibly indicate the orifice opening of said valve comprising a hollow vented body provided with a seat, a valve including a stem in said body in registry with said seat and movable axially with respect thereto, a packing recess within said body, a packing element within said recess and in sealing engagement with said stem, a longitudinally slotted sleeve surrounding said stem above said packing element, a graduated barrel secured to said body, a thimble revolvable about said barrel and provided with an index marking thereon, a pin extending through said thimble, slotted sleeve and stem to secure said thimble and stem together as an operating unit, means to rotate said thimble, slotted sleeve, stem and valve as a unit to provide axial movement to said valve and thimble with respect to said seat, the index marking on said thimble registering with one of the graduations on said barrel to indicate the orifice opening of said valve relative to the said seat and means engaging said stem above said thimble and contacting the upper end surface of said sleeve to lock said valve in any position independent of said valve actuating means.

JOHN C. BUSH.

REFERENCES CITED

The following references are of record in the file of this patent:

UNITED STATES PATENTS

| Number | Name | Date |
|---|---|---|
| 214,286 | Enright | Apr. 15, 1879 |
| 596,303 | O'Neill | Dec. 28, 1897 |
| 686,854 | Huxley | Nov. 19, 1901 |
| 743,507 | Hooper | Nov. 10, 1903 |
| 782,060 | Rothfuss | Feb. 7, 1905 |
| 1,684,835 | Larsen | Sept. 18, 1928 |
| 1,688,390 | Lanza | Oct. 23, 1928 |
| 1,926,413 | Tibbs | Sept. 12, 1933 |
| 2,091,671 | Campbell | Aug. 31, 1937 |
| 2,310,558 | Teeters | Feb. 9, 1943 |